No. 759,611. PATENTED MAY 10, 1904.
W. H. HOLMES.
CUSHION TIRE WHEEL.
APPLICATION FILED DEC. 29, 1903.
NO MODEL. 2 SHEETS—SHEET 2.
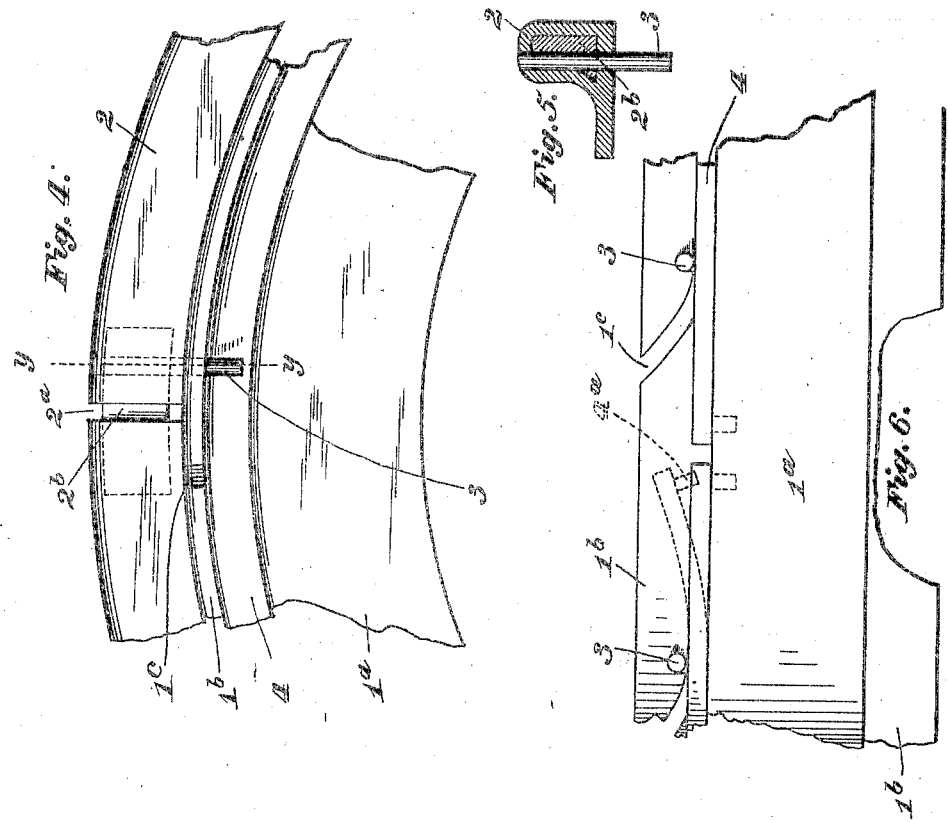
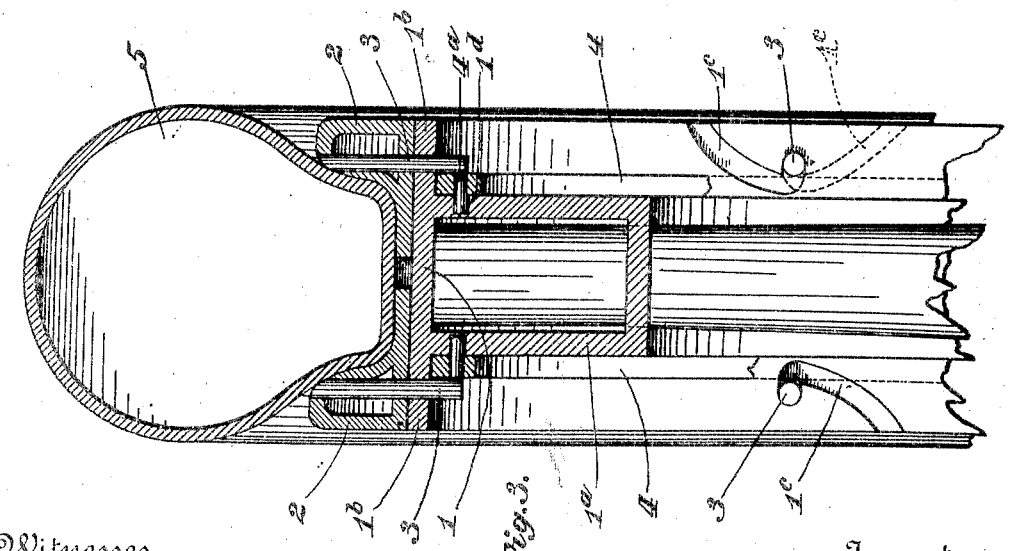
Witnesses
Benj. Finckel
James A. Cole
Inventor
William H. Holmes
by Finckel & Finckel
his Attorneys No. 759,611.  
Patented May 10, 1904.

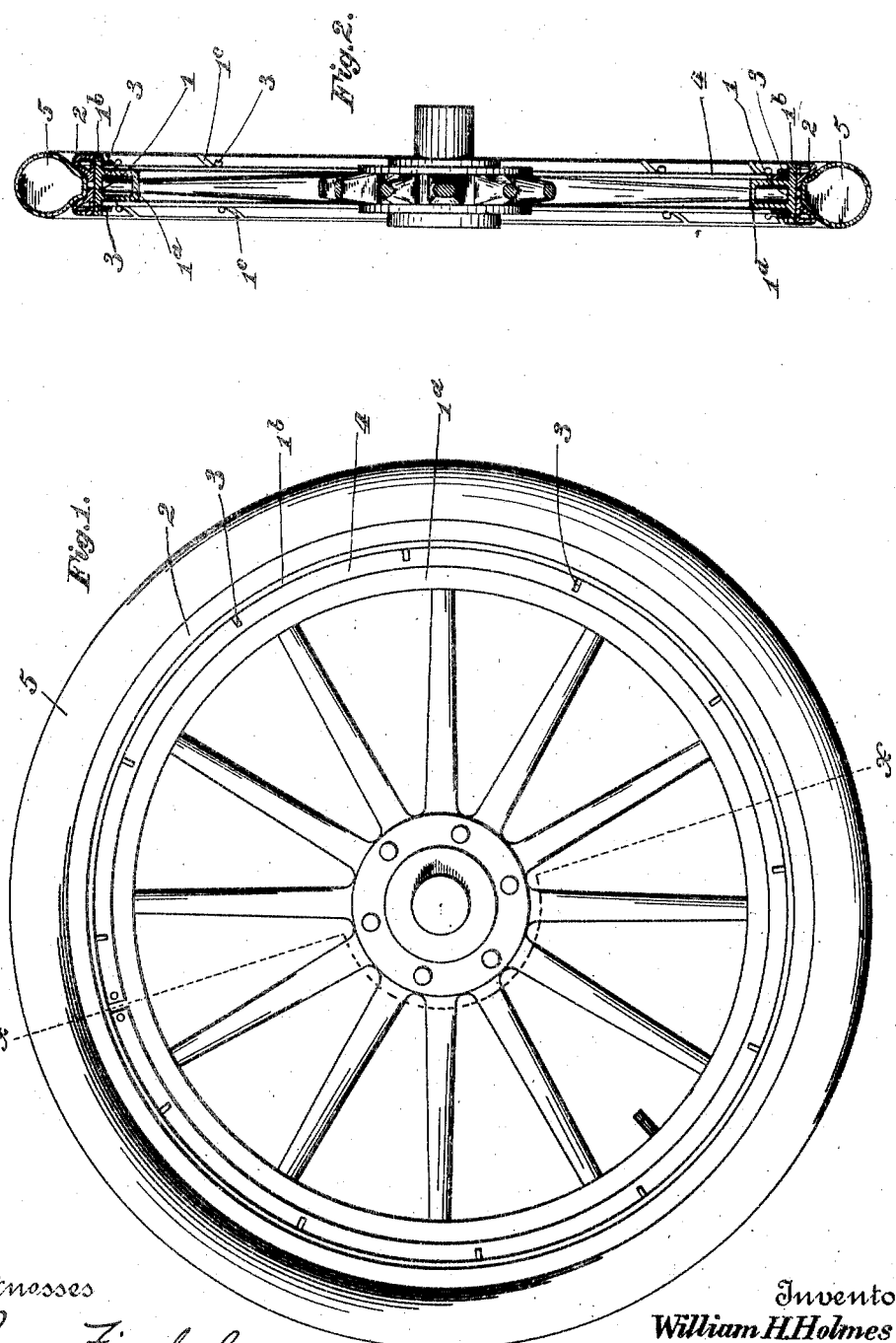

UNITED STATES PATENT OFFICE.

WILLIAM H. HOLMES, OF COLUMBUS, OHIO.

CUSHION-TIRE WHEEL.

SPECIFICATION forming part of Letters Patent No. 759,611, dated May 10, 1904.

Application filed December 29, 1903. Serial No. 187,019. (No model.)

*To all whom it may concern:*

Be it known that I, WILLIAM H. HOLMES, a citizen of the United States, residing at Columbus, in the county of Franklin and State of Ohio, have invented certain new and useful Improvements in Cushion-Tire Wheels; and I do hereby declare the following to be a full, clear, and exact description of the invention, such as will enable others skilled in the art to which it appertains to make and use the same.

Pneumatic tires have heretofore ordinarily been sprung in a deflated condition over the flanges into their channels on the wheels, and when such a tire is punctured it is usually necessary to remove it to put on a patch. When an automobilist is on the road at a place remote from a repair-shop and a tire is punctured and deflated, it has oftentimes been practically impossible to put on a patch so as to permit reinflation of the tire, and as a consequence the automobilist has been compelled to proceed on his way with a deflated tire, thus frequently irretrievably damaging the tire and injuring to some extent also the rim of the wheel.

The object of the present invention, therefore, is to provide an improved construction of wheel that will permit the ready placing on and removal of the tire from the rim, and the invention is embodied in the construction hereinafter described and claimed.

In the accompanying drawings, in which I have illustrated but one form of the invention, Figure 1 is a view in side elevation of a wheel according to my invention. Fig. 2 is a cross-sectional view on the line $x$ $x$ Fig. 1. Fig. 3 is a detail cross-section on a larger scale. Fig. 4 is a detail showing how the tire-holding flange can be made yielding. Fig. 5 is a sectional view of the flange on the line $y$ $y$, Fig. 4. Fig. 6 shows how the flange-locking ring can be sprung for securing and removal.

In the views, 1 designates the rim proper of the wheel. This is preferably made smooth and cylindrical in form and provided with a felly $1^a$. The rim 1 projects laterally at opposite sides of the wheel beyond the sides of the felly in edge portions $1^b$, and each edge portion is made with a series of slots $1^c$, somewhat in the form of a comma—that is, they each have a long inclined portion beginning at the extreme edge of the rim that curves inward toward the felly and a short transverse portion at the inner end of the long portion extending outward from the felly.

2 designates the tire-holding flanges, each preferably consisting of a hollow spring-ring split or divided at one point, $2^a$, Fig. 4, one of the open ends being provided with a block $2^b$, fitting and fixed therein and projecting therefrom slidably into the open opposite end of the ring, so that the latter can be slightly expanded or contracted without lateral separation of the ends. One of the pins 3, hereinafter referred to, can be used to secure the block $2^b$ fixedly in the flange.

3 designates a series of pins, each of which is radially secured in the tire-holding flange 2. Each flange is furnished with as many of the pins 3 as there are slots $1^c$ in one side of the rim 1, and these pins are of such size and so located and the slots are so formed that the pins will enter the said slots when the tire-holding flange is slid in the proper position laterally onto the rim 1. By giving a slight turning movement to the flange in the proper direction the pins 3 will be brought opposite the short outwardly-extending portions of the slot $1^c$, when the flanges can be moved outward to the end of the transverse portion of the slot, where the tire-holding flange will be latched from revolution in either direction with respect to the rim. After the tire-holding flange is brought into this position it can be locked from lateral movement by any appropriate means. That shown in my drawings consists of a split ring or band 4, having at its ends pins $4^a$, adapted to enter corresponding holes $1^d$ in the felly $1^a$. The split ring 4 is of a thickness to fit and fill the gap between the side of the felly and the pin 3, and it is applied by first inserting one of the pins $4^a$ in its holes $1^d$, placing the ring around the inner side of the edge portions $1^b$ between all the pins 3 and then springing the other pin $4^a$ into its socket $1^d$, somewhat as indicated in Fig. 6. The ring can of course be removed by reversing this process.

We come now to the manner of putting on the tire.

5 designates the tire, which is of any appropriate tubular form, provided with the usual inflating and deflating valve. In practice it will only be necessary to remove one of the tire-holding flanges 2 in order to put on or take off the tire. Because of the construction described the tire in its deflated condition can be made of such inside diameter as to snugly fit on the rim 1 or on the inwardly-extended base of the tire-holding flange, or both, and after the deflated tire has been placed around the rim the detached tire-holding flange is put on, as before described. The tire is then inflated as usual. The inflation of the tire tends to push by lateral pressure the holding-flanges 2 outward and to hold them in their latched position; but should the tire be unexpectedly punctured and deflated the locking device 4 prevents disconnection of the parts until intentionally effected. With this construction it will be observed, therefore, that the installation of the tire and its removal for examination and patching is accomplished by the simplest of operations and without the use of special tools or machinery. With the necessary patching material it can be done on the road remote from a repair-shop almost if not quite as expeditiously as in the shop.

The advantage in making the tire-holding flanges expansible and contractible resides, among other things, first, in the fact that a perfect fit between the flanges and the tire-holding ring will not be necessary, and, second, that such flanges will yield for differences in the rate of expansion and contraction due to heat and cold and the flanges therefore at all times be freely removable from the rim.

The slots $1^c$ in the edge portions $1^b$ of the rim 1 are shown in full lines, Fig. 3, to be of opposite trend; but they can be of similar trend on opposite sides, as indicated by dotted lines in the right-hand edge portion $1^b$ of said Fig. 3. When these slots are made of opposite trend, the friction of the tire on both flanges would prevent the tendency to move of a flange otherwise movable. When the slots are thus made, it may be practicable in some instances to dispense altogether with a locking device 4 and rely on the lateral pressure of the inflated tire to do the locking. In order to insure the entering and engagement of the pins 3 with the slots $1^c$ when the ring is slightly contracted or expanded, the pins 3 can be made of slightly smaller diameter than the slots.

Some parts may be used in connection with other or different parts and changes in the details of construction shown can be made without departing from the gist of the invention. Among these changes it may be mentioned that one only of the tire-holding flanges need be made removable and that the rim need not be in the form of a cylinder and that the tire in some instances may be solid instead of hollow.

What I claim, and desire to secure by Letters Patent, is—

1. In a cushion-tire wheel, the combination of a rim having a projecting edge portion, inclined slots in said edge portion and a tire-holding flange separate from and independent of the tire having pins to enter and engage said slots.

2. In a cushion-tire wheel, the combination of a rim having oppositely-projecting edge portions, inclined slots in said edge portions, and tire-holding flanges separate from and independent of the tire having pins to enter and engage said slots.

3. In a cushion-tire wheel, the combination of a rim having oppositely-projecting edge portions, oppositely-trending inclined slots in the edge portions and tire-holding flanges separate from and independent of the tire having pins to enter and engage said slots.

4. In a cushion-tire wheel, the combination of a rim having a projecting edge portion, inclined slots in said edge portion, a tire-holding flange separate from and independent of the tire having pins to enter and engage said slots and means for locking said flange in engagement with the rim.

5. In a cushion-tire wheel, the combination of a rim having a felly and a projecting edge portion, inclined slots in said edge portion, a tire-holding flange having pins to enter and engage said slots, and a movable ring interposed between the pin and the felly for holding the flange in engagement with the edge portion.

6. In a cushion-tire wheel, the combination of a rim having a felly and a projecting edge portion, inclined slots in said edge portion, a tire-holding flange having pins to enter and engage said slots, and a movable ring interposed between the pins and the felly and means for securing the ring to the felly.

7. In a cushion-tire wheel, the combination of a rim having a projecting edge portion, slots in said edge portion beginning at the periphery thereof and extending inward and terminating in an outwardly-extending portion, a tire-holding flange separate from and independent of the tire having pins to enter said slots, and a pneumatic tire adapted when inflated to press or hold the pins in the holding-flange in the outwardly-extending portions of said slots.

8. In a cushion-tire wheel, the combination of a rim having oppositely-projecting edge portions, each of said edge portions having slots beginning at its periphery and extending inward and terminating in outwardly-extending portions, tire-holding flanges separate from and independent of the tire having pins to enter and engage said slots, and a pneumatic tire adapted when inflated to press or hold the pins in the tire-holding flanges in the outwardly-extending portions of said slots.

9. In a cushion-tire wheel, the combination of a rim having oppositely-projecting edge portions, each of said edge portions having slots beginning at its periphery and extending inward and terminating in outwardly-extending portions, tire-holding flanges having pins to enter and engage said slots, and a pneumatic tire adapted when inflated to press or hold the pins in the tire-holding flanges in the outwardly-extending portions of said slots, said slots on opposite sides extending in opposite directions with reference to the circumference of the wheel.

10. In a cushion-tire wheel, the combination of a smooth cylindrical rim having its edge portion made with slots, a tire-holding flange separate from and independent of the tire to slide laterally onto said rim and having pins adapted to laterally enter and engage said slots, and means for holding said pins in engagement with said slots.

11. In a cushion-tire wheel, the combination with the rim thereof and a tire, of a transversely-divided and laterally-slidable tire-holding metallic flange, and means longitudinally and freely slidable with respect to said flange connecting the ends thereof permitting the expansion and contraction of said flange but preventing the lateral separation of said connected ends when in place on the rim.

12. In a cushion-tire wheel, the combination of a rim, a tire-holding flange separate from and independent of the tire laterally movable onto said rim, a slot in one of said parts extending from the outer edge thereof inward and then outward and a pin on the other part adapted to enter and engage said slot.

In testimony whereof I affix my signature in presence of two witnesses.

WILLIAM H. HOLMES.

Witnesses:
GEORGE M. FINCKEL,
SAMUEL W. LATHAM.